Patented May 23, 1944

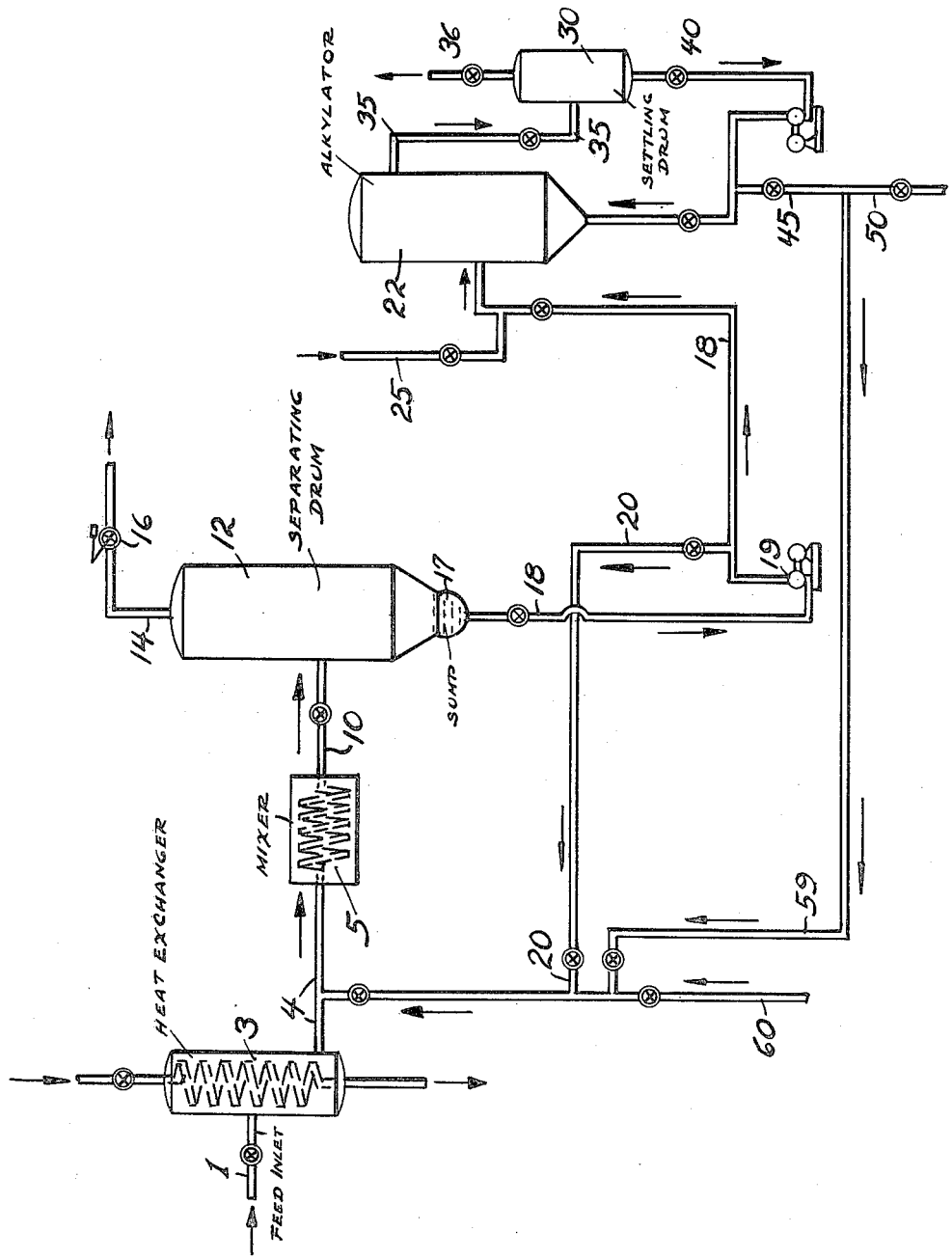

2,349,415

UNITED STATES PATENT OFFICE 2,349,415

CHEMICAL PROCESS

Arthur A. Draeger and William B. Franklin, Baytown, Tex., assignors to Standard Oil Development Company, a corporation of Delaware Application April 8, 1942, Serial No. 438,128

12 Claims. (Cl. 62—170)

This application is a continuation-in-part of Serial No. 424,246, filed December 24, 1941.

The present invention relates to the treatment of hydrocarbons and, in particular, it relates to a method for rapidly extracting olefins from a mixture of liquefied hydrocarbons containing olefins with sulfuric acid. Our improved process is particularly characterized by the fact that we may extract olefins from a liquefied mixture containing the same without causing degradation of said olefins.

It is generally known that in a process involving the contacting of olefins with acids such as sulfuric acid and the like degradation of the olefins occurs through polymerization, oxidation, condensation, sludging, and the like. In most extraction processes these undesired side reactions are objectionable in that, of course, they result in a loss of yield of the desired final product. In the usual process for extraction of olefins the olefin-containing stream is contacted with the acid in an absorption vessel of such size that a relatively long contact between the olefin and the acid is unavoidable and, therefore, extensive degradation results. Upon completion of the liquid extraction, a considerable period of time is also required for complete separation of the phases (hydrocarbon and acid). This time period required for stratification of the phases results in further degradation and, of course, loss in yield. It is also known that considerable heat is evolved in the extraction and consequently refrigeration must be resorted to in order to prevent undue temperature rises.

One object of our present process, therefore, is to extract olefins from a mixture containing the same under such conditions that a maximum yield of the desired olefins is obtained.

Another object of our invention is to effect a separation of the desired olefins from a mixture containing the same by contacting the olefin-containing mixture for a short period of time with sulfuric acid under conditions such that there is a minimum degradation of the olefin contained in the feed stock.

Other and further objects of our invention will appear more fully hereinafter.

Speaking generally at first, our invention resides in the concept of contacting an olefin-containing mixture, for example, a liquefied mixture of propane and propylene, with an acid, for example, sulfonic acid, in a coil or an orifice mixer or other short time of contact mixing device under temperature and pressure conditions such that the non-reacting components, for example, propane, are substantially completely vaporized at the mixer outlet. The pressure is controlled in order that the acid extract will leave the mixer at the desired temperature. The mixer effluent consists of the non-reactants (for example, propane) in the vapor phase and the acid extract in the liquid phase. With such a mixture substantially complete separation of vapor and liquid can be obtained in a separation drum or the like under the conditions of short time and, hence, the extract can be rapidly removed for subsequent processing to utilize the olefins. In our process, we utilize the refrigeration capacity of the non-reactive components contained in the feed; that is to say, the propane or other paraffin, in that the latent heat of the vaporization of non-reactants will absorb all or part of the heat liberated during the extraction. Depending upon the composition of the feed stock to the extraction zone, it may be necessary to supply external heat or refrigeration in order to obtain the desired mixer outlet conditions. Thus, for example, refrigeration can be supplied by dilution of the feed with vaporizable non-reactants such as propane.

We shall now illustrate our invention by means of specific examples, it being understood that the precise details regarding operating conditions hereinafter set forth are merely illustrative and do not constitute a limitation upon our invention.

EXAMPLE 1

A refinery propylene-propane fraction having the following analysis expressed as mol per cent was treated: Ethane, 9.4 mol per cent; ethylene, 0.4 mol per cent; propylene, 21.1 mol per cent; propane 68.3 mol per cent; butane, 0.8 mol per cent. This mixture was contacted with sulfuric acid having a concentration of 90-98% by weight at a temperature of 60-80° F., while maintaining a pressure of about 30-40 pounds per square inch gauge at the outlet of a mixer coil. In this run, 98.5% of the olefin was recovered in the acid extract.

An important use of the olefins recovered according to our improved method is to serve as an alkylating agent for an isoparaffin and, consequently, our improved method of extracting olefins provides a more suitable olefin acid extract feed for the alkylation stage of a two-stage alkylation process to produce alkylates of high quality blending value, and in this modification of our invention we may proceed substantially as follows:

An olefin-bearing feed stock is contacted with strong sulfuric acid (85–100% by weight), and the resulting extract is then contacted with an isoparaffin for the production of an alkylate having a high octane number. More specifically, the olefin-bearing feed stock is contacted with a recycle olefin acid extract and recycled acid from the alkylation stage in a coil, orifice plate mixer, or other device in which intimate contact between hydrocarbon and acid is effected. As the olefins are absorbed in the acid phase, the non-reactants are vaporized. The mixed hydrocarbon vapor acid extract flows to a separation drum where rapid separation of the two phases occurs. The vapors are taken off overhead through a release valve, and may be processed in any desired manner to obtain particular products. The extract, on the other hand, is taken as bottoms from the separation drum, a low liquid level being maintained in order to minimize contact time. A portion of the extract removed from the separation drum is recycled to the absorption stage in order to maintain the desired hydrocarbon-acid phase proportions for maximum contact efficiency, and also to control the temperature gradient through the mixing device. The remainder of the acid extract containing substantially all of the olefins and all of the acid feed to the absorption step is delivered to the alkylation stage in which the extract is contacted with acid of alkylation strength and the isoparaffin feed. The reacted hydrocarbon and olefin-free acid phases from the alkylation reactor are separated in a settling zone, the hydrocarbon fractionated to obtain the alkylate and unreacted isoparaffin for recycling to the alkylation stage, and the acid phase from the settler is returned in part to the alkylation stage and in part to the absorption step. The relative amounts of acid and olefins charged to the absorption step are controlled in order to yield an olefin acid extract containing the desired molal olefin to acid ratios for the purpose of controlling undesirable side reactions such as the formation of neutral esters, polymers, oxidation products, and the like. We have found that good results are obtained by charging to the absorption zone a molal ratio of acid to olefin of from 1 to 15 mols of acid per mol of olefin with, however, a molal ratio of about 3.5 mols of acid per mol of olefin preferred.

EXAMPLE 2

In order to illustrate our invention more completely six runs were made in which propylene was absorbed in accordance with our improved method and the resulting acid extract was subsequently alkylated with isobutane in an alkylation stage. Acid strengths varying between 93.9 and 98% by weight sulfuric acid were employed in a coil absorber which comprised lengths of ¼ inch pipe varying between 20 and 48 feet. Mixing conditions in the coil absorber were varied by changing the pressure drops of the reactants passing therethrough. Other absorption conditions are those given in the table wherein detailed data describing the runs are set forth.

In the alkylation stage the acid extract from the absorber was contacted with isobutane at a temperature between 70° F. and 75° F. The alkylation stage was of the turbo mixer type and the acid-hydrocarbon mixture therein was maintained at a ratio of 1:1.

Yields and product inspection data of alkylate produced in these six runs are also presented in the following table:

*Table I*

| Absorber conditions: | | | | | | |
|---|---|---|---|---|---|---|
| Coil length, ft. of ¼" pipe | 30 | 30 | 30 | 20 | 48 | 48 |
| Pressure drop through coil ........ lbs./sq. in. | 35 | | 40 | 60 | 70 | 30 |
| Disengaging pressure ........ do. | 40 | 40 | 40 | 40 | 40 | 40 |
| Fresh acid feed rate ........ cc./min. | 200 | | 100 | 50 | 100 | 225 |
| Titratable acidity, percent $H_2SO_4$ | 98.0 | 95.0 | 95.0+ | 94.5 | 93.9 | 94.5 |
| Extract recycle rate ........ cc./min. | 1,200 | | 1,200 | 1,600 | 1,400 | 1,600 |
| Molal acid-olefin ratio | 15.5:1 | | 7.0:1 | 3.5:1 | 5.3:1 | 9.2:1 |
| Residue gas, mol per cent propylene | 1.2 | 1.9 | 2.7 | 4.1 | 0.5 | 0.1 |
| Absorption efficiency ........ per cent | 94.0 | 91.0 | 87.0 | 80.0 | 98.5 | 99.5 |
| Extract temperature ........ °F. | 70 | 63 | 73 | 70 | 78 | 70 |
| Reactor conditions: | | | | | | |
| Reactor type | Turbo | Turbo | Turbo | Turbo | Turbo | Turbo |
| Temperature ........ °F. | 75 | 70 | 75 | 70 | 71 | 70 |
| Acid-hydrocarbon ratio (vol.) | 1:1 | 1:1 | 1:1 | 1:1 | 1:1 | 1:1 |
| Spent acid titratable acidity, percent $H_2SO_4$ | | | 94.5 | 93.9 | 93.4 | 94.0 |
| Yield of total alkylate (based on olefins charged): | | | | | | |
| Weight, per cent | 164 | 143 | 193 | 217 | 194 | 174 |
| Volume, percent | 123 | 108 | 146 | 165 | 147 | 132 |
| Product inspection—total alkylate: | | | | | | |
| I. B. P.—200° F. ........ volume per cent | 57.0 | 70.0 | 72.5 | 79.2 | 78.1 | 72.5 |
| 200°–265° F. ........ do. | 21.8 | 12.7 | 14.6 | 11.3 | 9.6 | 15.2 |
| Heavier ........ do. | 21.2 | 17.3 | 12.9 | 9.5 | 12.3 | 12.0 |
| Gravity, °A. P. I. ........ do. | 68.7 | [1] 71.8 | 70.6 | 72.2 | 71.6 | 71.8 |
| Engler mid-boiling point ........ °F. | 206 | 194 | 196 | 195 | 195 | 196 |
| Bromine number | | | | | | |
| I. B. P.—265° F. fraction: | | | | | | |
| Gravity ........ °A. P. I. | 74.2 | 75.5 | 73.8 | 74.3 | 74.9 | 74.1 |
| Engler Mid-Boiling Point ........ °F. | 192 | 189 | 189 | 191 | 190 | 192 |
| A. S. T. M. clear octane number | 88.4 | 88.3 | 88.6 | 89.2 | 89.4 | 89.4 |
| Bromine number | 1.6 | 2.8 | 0.0 | 0.0 | 0.4 | 0.4 |

[1] 10% Butane.

It may be seen by inspection of the data that the acid extract produced in accordance with our invention may be alkylated to produce an alkylate which is suitable for use as an aviation gasoline or as aviation gasoline blending agent. Furthermore, the results indicate that by varying the conditions of absorption in the coil absorber yields of alkylate (based on the olefins) approaching theoretical were attained.

In order to explain our invention more fully reference is made to the accompanying drawing which shows diagrammatically a form and arrangement of apparatus elements in which our invention may be carried into practical effect.

Referring in detail to the drawing, a feed stock containing liquefied olefins is introduced into the system through line 1 and thence passed through a heat exchanger 3 where it may be either heated or cooled depending upon the temperature of the feed stock and the amount of refrigeration that will be subsequently required in the absorption zone. For example, if the feed stock contains 15–20% propylene and is available at a temperature of about 78° F., and a pressure of about 40 pounds per square inch is maintained in vessel 12, heat need not be extracted or added in heat exchanger 3 under ordinary conditions because it has been found that the evaporation of the paraffin in the extraction phase proper will compensate for the heat liberated during the reaction between the olefin and the acid. However, it will be understood that where the olefin content of the charging stock is very low, say from 5 to 10%, it may be necessary to add heat to the charging stock passing through the heat exchanger and, by the same token, when the relative amount of olefin is high in the charging stock, it may be necessary to extract heat in the heat exchanger 3. The charging stock is withdrawn from heat exchanger 3 to line 4 and discharged into a mixing device consisting essentially of an orifice mixer or a coil 5, thence withdrawn from said mixer through line 10 and discharged into a separation drum 12 from which drum the paraffins and other unabsorbed material may be withdrawn through line 14 carrying a release valve 16. The bottoms from drum 12 are withdrawn through line 18. Attention is directed to the fact that a minimum amount of extract was maintained in a sump 17 at the bottom of separation drum 12 so that the average residence time of the extract in the system consisting of line 4, coil 5, line 10, separation drum 12, line 18, pump 19, line 20, and line 60, is at a minimum. The bottoms in line 18 are discharged into pump 19 and then recycled in part through lines 20 and 60 to line 4 in order to control the temperature conditions in mixer 3. The remainder of the extract is discharged into reaction vessel 22. An isoparaffin is introduced into the system through line 25, is discharged into line 18, and thereafter, together with the acid extract, is discharged into alkylation drum 22, as shown in the drawing, and thereafter alkylated with the isoparaffin under known conditions. Reaction products are withdrawn from the alkylator through line 35 and discharged into settling drum 30. The product is taken off from drum 30 overhead through line 36. The spent acid is withdrawn from settling drum 30 through line 40 and recycled in part to the alkylation zone in the known manner and in part through line 45 to line 60, thence into line 4 for reuse in the process. Fresh acid is introduced into the system through line 60 to compensate for that used in the absorption stage and the alkylation stage.

While we have illustrated our invention specifically with respect to the absorption of olefins from a mixture containing propanes and olefins it will be understood that our invention also includes the separation of any normally liquid or gaseous olefins from a hydrocarbon mixture containing olefins, paraffins, naphthenes, and the like. For example, the following conditions have been found particularly useful in absorbing butylenes from butylene-containing streams:

| | |
|---|---|
| Temperature | 20° F. to 60° F. |
| Disengaging press., Abs. | 8 to 40 |
| Acid/olefin mol. ratio | 0.5:1 to 1.5:1 |
| Contact time, minutes | 75 max. (preferably less than 25) |
| Extract recycle ratio | At least 10 volumes recycle extract per volume make-up acid |
| Effective acidity[1] of charge acid, per cent by weight $H_2SO_4$ | 85 to 100 |

[1] May contain up to 10% by weight of organic matter.

In the modification we have shown, heat exchanger 3 is disposed in line 1. It will be understood that it is within the spirit of this invention to transpose heat exchanger 3 from line 1 to line 20, or we may use a second heat exchanger in line 20, or we may use a heating or a cooling medium surrounding the mixing coil 5.

Many modifications of our invention will suggest themselves to those familiar with this art without departing from the spirit thereof.

We claim:

1. A process for extracting an olefinic component from a mixture containing olefinic and paraffinic components which comprises discharging a liquefied mixture thereof into a zone where it contacts concentrated sulfuric acid and controlling the temperature conditions prevailing in the extraction zone, at least in part, by reducing the pressure on the extraction zone so that at least part of the paraffinic components is evaporated and the heat thereby absorbed compensates, at least in part, for the heat evolved during the reaction between the acid and the olefinic components.

2. The process set forth in claim 1 in which the residence time of the acid and the olefinic components in the extraction zone is sufficiently short to avoid degradation of the latter.

3. The process set forth in claim 1 in which reaction product of acid and olefinic components and the unreacted material are withdrawn from the contacting zone and discharged into a separation zone where the unreacted portion is rapidly withdrawn in the vapor phase and the extract is withdrawn in liquid phase.

4. The process of extracting olefins from a mixture of liquefied hydrocarbons containing said olefins together with paraffins which comprises contacting the mixture with sulfuric acid under conditions such that the paraffins contained in the mixture are permitted to evaporate and thereby assist in the prevention of degradation of the said olefins by virtue of the refrigerating effect of the evaporating paraffins.

5. The process set forth in claim 4 in which the said mixture of hydrocarbons contains normally gaseous paraffins and olefins.

6. The method set forth in claim 4 in which the degradation of the olefins is further avoided by external refrigeration.

7. The method of separating olefins from a hydrocarbon mixture containing olefins and paraffins which comprises contacting the said mixture in liquid form with a sulfuric acid, adjusting pressure conditions so that during the said contact the paraffins are permitted to vaporize, and segregating the vaporized paraffins from the rest of the mixture.

8. The process set forth in claim 7 in which the paraffins and olefins are normally gaseous.

9. The process set forth in claim 7 in which the paraffins and olefins are normally gaseous and in which external cooling means are supplied to assist in the prevention of degradation of said olefins.

10. The method of separating $C_2$, $C_3$, $C_4$ olefins from a mixture containing $C_2$, $C_3$ and $C_4$ olefins and paraffins, which comprises mixing the liquefied $C_2$, $C_3$ and $C_4$ paraffins with sulfuric acid and subjecting the mixture to conditions such that the $C_2$, $C_3$ and $C_4$ paraffins are permitted to vaporize, thereby cooling the remainder of the mixture and substantially preventing degradation of said olefins.

11. The process set forth in claim 10 in which the sulfuric acid is of a concentration of from about 85 to 100% by weight, in which the temperature of the mixture is between 20° to 80° F., and a pressure of from about 8 to about 55 pounds absolute is maintained on one portion of the mixture.

12. A process for separating olefins from a mixture thereof with normally gaseous paraffins which comprises liquefying the mixture, mixing the liquefied mixture with sulfuric acid of a concentration in excess of 85% by weight under a pressure sufficient to keep the mixture liquid at about room temperature for a length of time sufficient to dissolve the olefins in the acid, suddenly reducing the pressure on the mixture sufficiently to cause vaporization of the normally gaseous paraffins to thereby absorb at least in part the heat of solution of the olefins in the acid and separating the acid extract from the vaporized hydrocarbons.

ARTHUR A. DRAEGER.
WILLIAM B. FRANKLIN.